US 6,582,516 B1

(12) United States Patent
Carlson

(10) Patent No.: US 6,582,516 B1
(45) Date of Patent: Jun. 24, 2003

(54) CONTINUOUS BATCH SEED COATING SYSTEM

(75) Inventor: Brent T. Carlson, Bloomington, MN (US)

(73) Assignee: Gustafson, LLC, Plano, TX (US)

( * ) Notice: Subject to any disclaimer, the term of this patent is extended or adjusted under 35 U.S.C. 154(b) by 19 days.

(21) Appl. No.: 09/724,221

(22) Filed: Nov. 28, 2000

Related U.S. Application Data

(60) Provisional application No. 60/167,815, filed on Nov. 29, 1999.

(51) Int. Cl.⁷ .............................. B05C 5/00; B06B 3/02
(52) U.S. Cl. ........................... 118/303; 118/13; 118/19; 118/29
(58) Field of Search .................. 118/13, 16, 17, 118/19, 29, 30, 303, 304, 712; 366/137.1, 138; 384/620, 616

(56) References Cited

U.S. PATENT DOCUMENTS 566,166 A  *  8/1896  Goodell et al. ............. 384/248
4,465,017 A  *  8/1984  Simmons ..................... 118/304
4,932,787 A  *  6/1990  Fasano ........................ 366/246
5,718,768 A  *  2/1998  Ido ............................. 118/712

FOREIGN PATENT DOCUMENTS

DE        4411058        4/1997

* cited by examiner

Primary Examiner—Richard Crispino
Assistant Examiner—Yewebdar T Tadesse
(74) Attorney, Agent, or Firm—Patterson, Thuente, Skaar & Christensen, P.A.

(57) ABSTRACT

The continuous batch seed coating system of this invention includes a coating unit, liquid and dry treatment metering systems, a seed metering system, and a PLC controller. The coating unit includes a substantially unitary bowl, which is rotated to cyclically rotate seed being treated. The bowl is rotated within an enclosure, then evacuated after being treated. A peristaltic pump and a hopper-auger unit provide liquid and dry seed treatment formulations to the coating unit. The automated seed metering system pre-weighs seed to be conveyed into the coating unit. The PLC controller controls the retention time in the coating unit, the amounts and timing of seed treatment formulations, conveys seed to the coating unit, and optionally sounds alarms when one of the treatment formulations is not available or when seed is not present in the seed metering system.

26 Claims, 10 Drawing Sheets

CONTINUOUS BATCH SEED COATING SYSTEM

CROSS-REFERENCES TO RELATED APPLICATIONS

This application claims priority under 35 U.S.C. §119 (e) to, and hereby incorporates by reference, U.S. Provisional Application No. 60/167,815, filed Nov. 29, 1999.

BACKGROUND OF THE INVENTION

1. Field of the Invention

This invention relates to seed treaters and, in particular, this invention relates to an automated and programmable seed treater for relatively small amounts of seed.

2. Background of the Invention

The benefits of treating planting seed are well-known. Among these benefits are reduced, or substantially eliminated, incidences of stand loss due to diseases and insects. With the advent of the newer fungicides and insecticides, extremely small amounts of active ingredients are coated on the seed surfaces. Therefore, in order to uniformly coat the seeds, treaters must administer ever decreasing amounts of formulations.

Both continuous and batch seed treaters are known to the art. However, most of these reduced treaters are designed to efficiently treat relatively large seed lots. Smaller seed lots have traditionally been treated by efficient batch systems. These small seed lots are often extremely valuable. Examples of these small seed lots include parent seeds (e.g., breeders, foundation, registered), hand-produced hybrid seeds, and vegetable seeds. These small seed lots must be treated uniformly with fungicides and insecticides to eliminate losses from diseases and insects. Also due to their high value, carryover between the seed lots must be eliminated. Heretofore, the seed lots were treated using inefficient protocols and equipment to eliminate the possibility of carryover. These protocols and equipment often resulted in seed lots, which were not treated uniformly.

To this end, a seed treating device is disclosed in German Patent DE 4411058, issued Apr. 3, 1997, and hereby incorporated by reference. This device has a mixing bowl connected to a high revolution, multi-turn actuator and a mechanism to feed seed into the mixing bowl. The bowl rotates to rotate seed been treated therein. The seed treating formulation is sprayed in the bowl while the seed is being rotated to uniformly coat the seed with the formulation. While effective, this device has two major limitations. The first limitation is that there is no mechanism for horizontally adjusting the position of the mixing bowl during assembly or after repair. Therefore, positioning the bowl requires excessive amounts of time and extensive trial and error. The second limitation relates to the method of forming the mixing bowl. The mixing bowl is formed from several metallic sheets. These sheets are bonded together, then formed into a bowl by being pressed and often hand beaten until the desired bowl shape has been attained. These bowls are not uniform and either size or shape. Therefore, other components must be especially made to fit these bowls. Consequently, repairing and replacing bowls of this treater usually involves replacing other parts as well.

There is then a need for a seed treater, which will efficiently treat small seed lots and which has bowls which are easily adjusted and uniform in size.

SUMMARY OF THE INVENTION

This invention substantially meets the aforementioned needs of the industry by providing a continuous batch seed coating system. The present continuous batch seed coating system efficiently treats small seed lots and eliminates carryover between seed lots. The present continuous batch seed coating system includes a coating unit. In a preferred embodiment, the present coating unit has a generally cylindrical lower member, a spin formed rotating bowl-shaped member, and a lid-shaped upper member. The bowl-shaped member is rotatably disposed in the lower member. The lower member, bowl-shaped member, and upper member cooperate to define a seed treating area. Also in a preferred embodiment, an adjustment assembly (mechanism) horizontally adjusts the position of the bowl-shaped member within the cylindrical lower member. The bowl-shaped member may be formed from a single metallic sheet and thus be unitary.

The present continuous batch coating system may further include liquid and dry treatment metering systems for conveying seed treatment formulations to the coating unit. The liquid metering system may include a peristaltic pump. The peristaltic pump conveys liquid seed treatment formulations through a house to the coating unit. The dry treatment metering system may convey dry seed treatment formulations from a hopper to the coating unit via an auger.

A seed metering system may be included within the present batch seed coating system. The seed metering system may include a holding bin with a clamshell gate, a weigh hopper and a load cell. The clamshell gate is closed upon sensing a predetermined seed weight in the weigh hopper. When the coating unit is ready to treat a batch of seed, the weigh hopper dumps seed their within into the coating unit.

The present continuous batch seed coating system may also include a PLC controller. In a preferred embodiment, the PLC controller controls seed retention time within the coating unit, causes liquid and/or dry seed treatment formulations to be dispensed to the coating unit, and actuates the seed metering system to deliver a predetermined amount of seed to the coating unit.

It is therefore an object of this invention, to provide a coating unit with a rotatable bowl formed from a single, metallic workpiece.

A yet further object of the present invention is to provide an upper (lid) coating unit member formed from a single, metallic workpiece.

A still further object of the present invention is to provide a coating unit upper (lid) member and a coating unit bowl member with uniform sizes and shapes.

Another object of the present invention is to provide interchangeable coating unit upper (lid) members and coating unit bowl members.

These and other objects, features, and advantages of this invention will become apparent from the description which follows, when considered in view of the accompanying drawings.

It is understood that the above-described figures are only illustrative of the present invention and are not contemplated to limit the scope thereof.

DETAILED DESCRIPTION OF THE INVENTION/DRAWINGS

Figure 1:
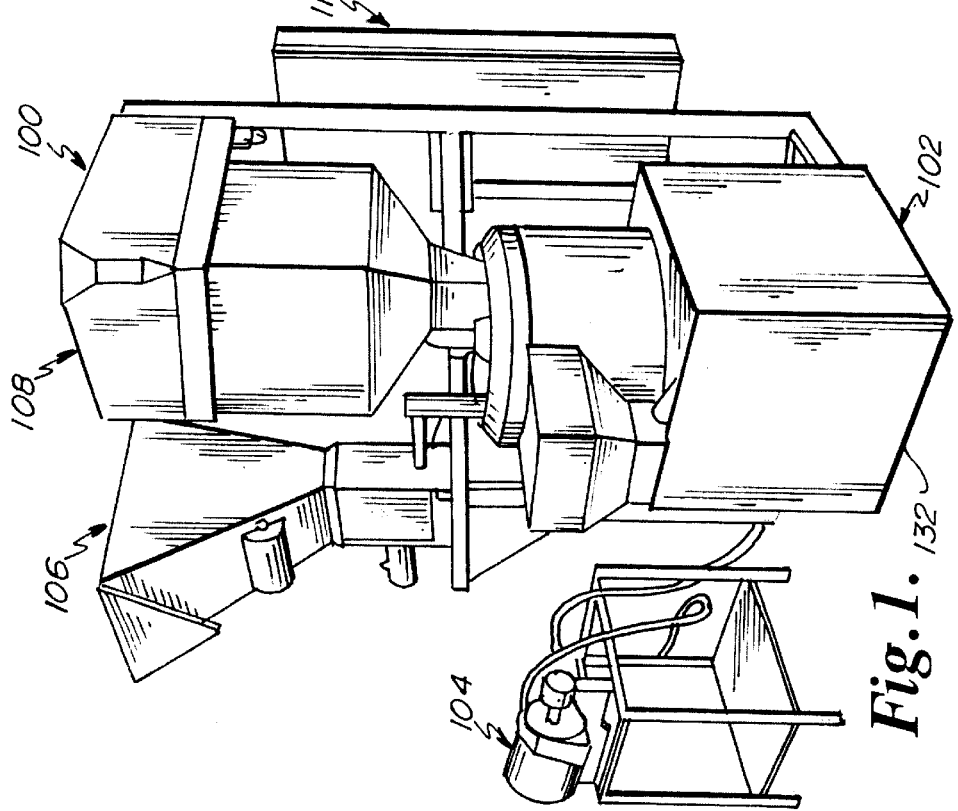
FIG. 1 is a first perspective view of the present continuous batch seed coating system.
Figure 2:
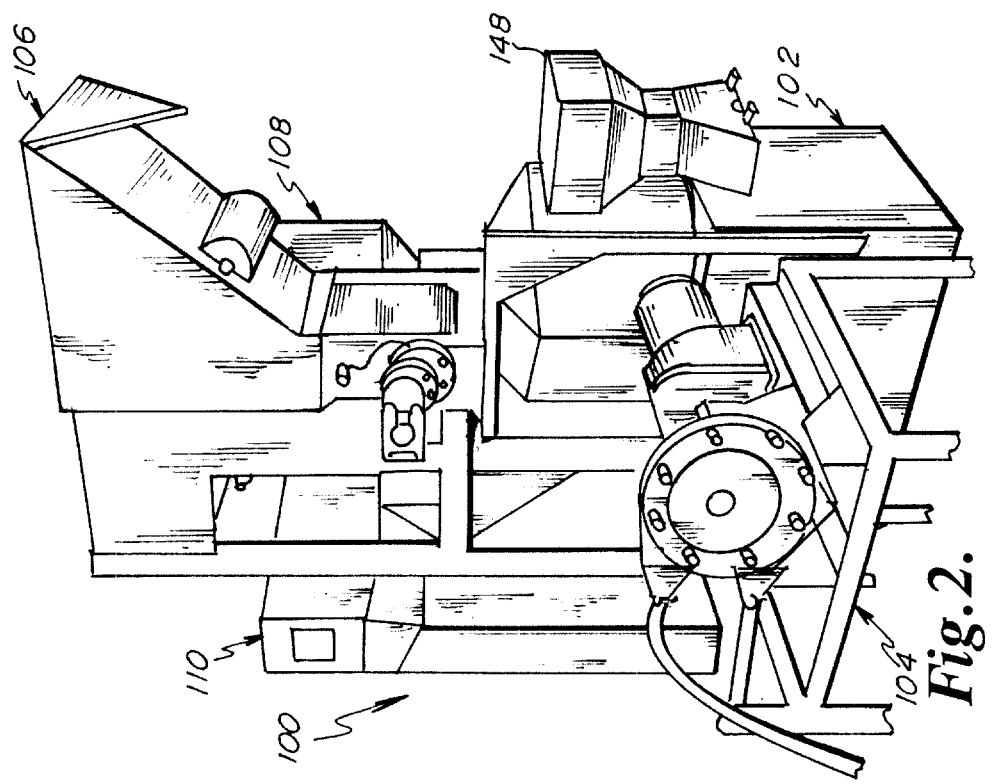
FIG. 2 is a second perspective view of the continuous batch seed coating system of FIG. 1.
Figure 3:
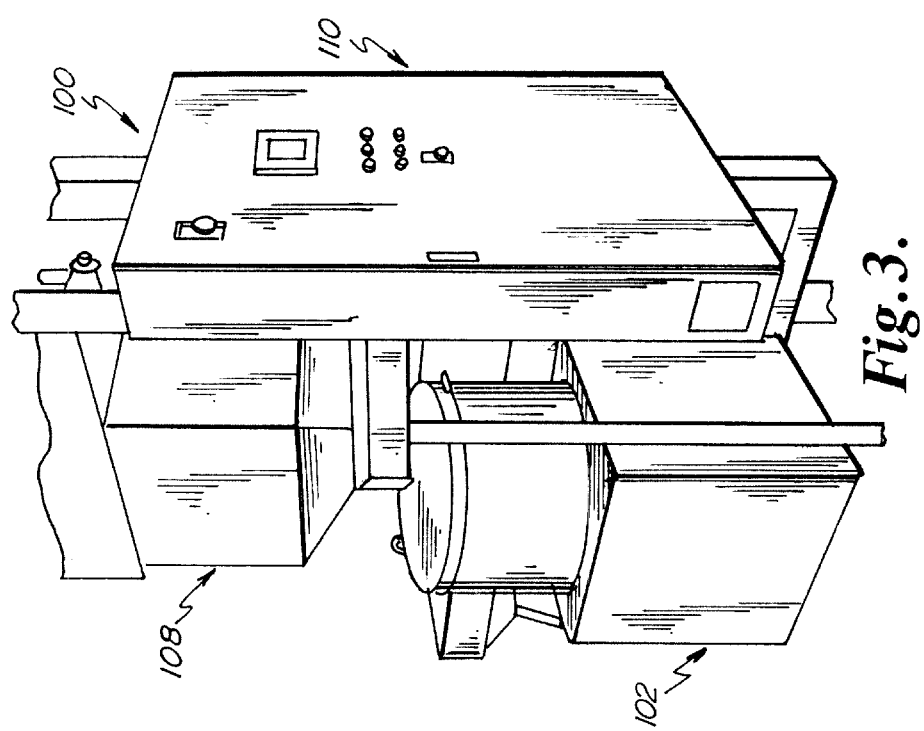
FIG. 3 is a third perspective view of the continuous batch seed coating system of FIG. 1.

Referring to FIGS. 1–3, an exemplary continuous batch seed coating system of this invention is depicted generally at 100 and includes a seed coating (mixing) unit 102, one or more treatment metering systems such as a liquid treatment metering system 104 and a dry treatment metering system 106, a seed metering system 108, and a PLC controller 110.

Figure 4:
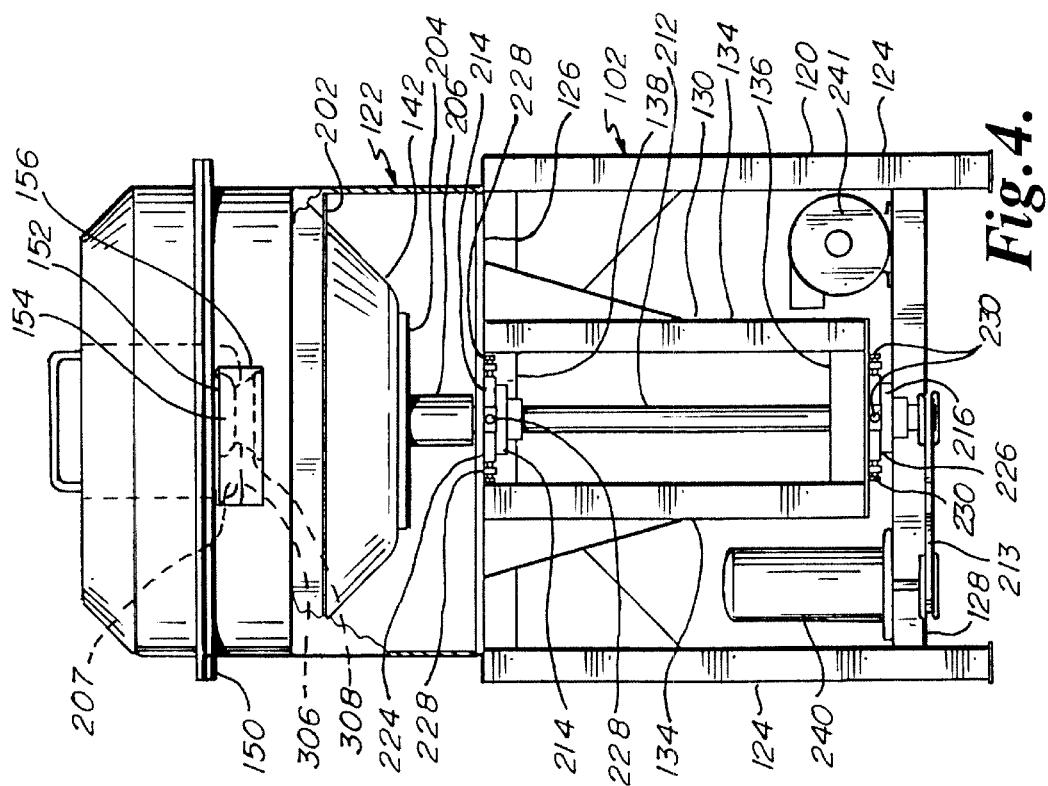
FIG. 4 is a side view of a batch seed coating unit with portions of the housing removed.
Figure 5:
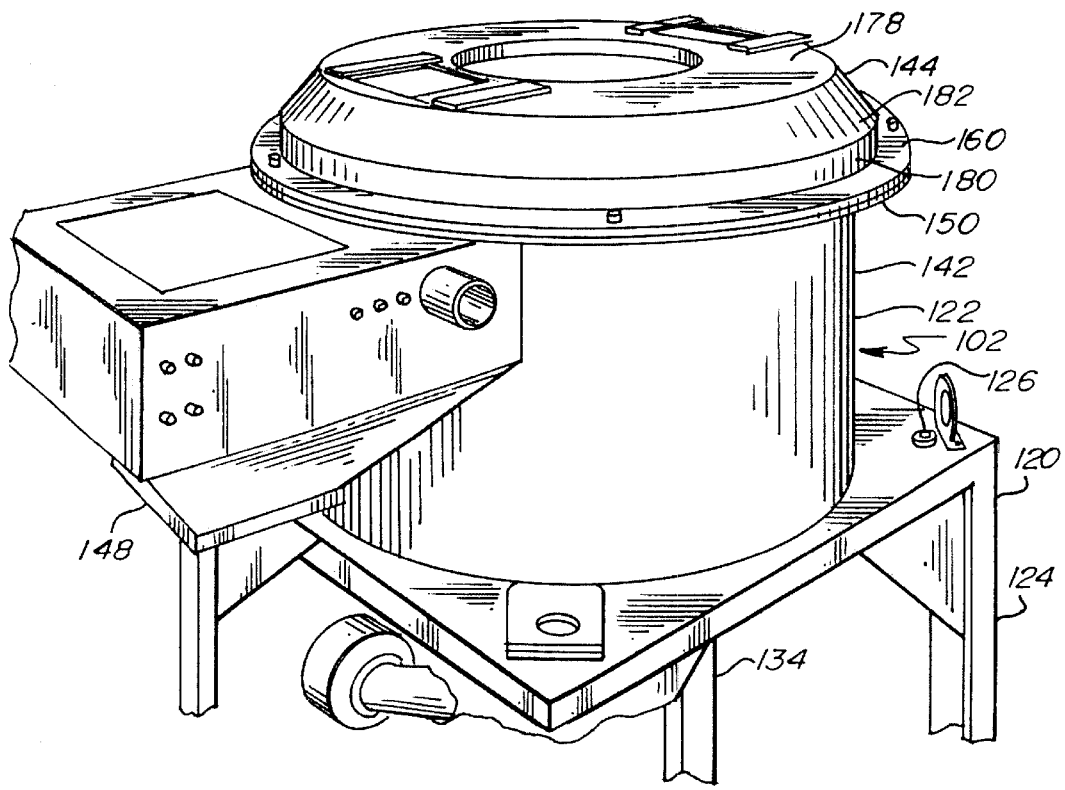
FIG. 5 is a perspective view of an upper portion of the present coating unit.

FIGS. 4 and 5 show one embodiment of the present coating unit 102. The coating unit 102 includes a base 120 and a coating assembly 122. The base 120, in turn, includes plurality of (e.g., four) legs 124, upper and lower supports 126 and 128, and a bracket 130. A shroud 132 may enclose the base 120. The bracket 130 has four vertical supports 134 and horizontal members 136 and 138.

As depicted in FIGS. 4, 5, 6, 7, and 8, the coating assembly 122 of this embodiment has respective lower, upper (lid), and treating (bowl) members 142, 144 and 146 and a treated seed receiving unit 148. The lower member 142 is generally cylindrical and accommodates the treating member 146 in this embodiment. The lower member 142 maybe fixed to the upper support 126 of the base 120, e.g., by welding. A flange 150 extends from an upper margin of the lower member 142. Threaded holes 115 are defined in the flange 150. The lower member 142 further defines an opening 152. A door 154 is attached to the lower member 142 by a hinge 156. A mechanism 158 (not shown) pivots the door open and closed during operation. After the seed has been treated, the door 154 is opened to allow the seed to enter the receiving unit 148, where it can be transferred to a tank or bagged.

A flange 160 extends from a main portion 162 of the upper member 144. The flange 160 is attached to the main portion 162 by welds in this embodiment. The main portion 162 defines a central opening 164, ingress/access openings 166, and generally square openings 168. The openings 164 generally straddle the opening 164 in this embodiment. The flange 160 of the upper member 144 defines a plurality (e.g., four) holes 170, which align with the holes 151 in the flange 150. On the upper member outer surface 172, optional covers 174 are secured in place over openings 166 via brackets 176. The holes 166 may be used for ingress of seed to be treated or for inspection between seed batches. The openings 168 may accommodate tubes or the like which convey seed treatment into the present seed coating unit. The central opening is for a portion of the liquid metering device more fully disclosed hereinbelow.

In this embodiment, the upper member main portion 162 is substantially unitary, being spin formed from a single sheet of metal as described hereinbelow, but may be considered to include or display a generally horizontal first portion 178, a generally vertical second portion 180, and an angled portion 182 extending between the first and second portions. A multiplicity of vanes 184 extends from an inner surface 186 of the upper member 144. The vanes 184 are attached to inner surfaces of second and third portions 180 and 182 and extend over peripheral regions of the first portion 178. In some embodiments, the vanes 184 are generally arcuate as they extend from the second portion 180.

The seed treating member 146 includes a generally bowl-shaped portion 200, a flange 202, a base 204, and a cylinder 206. The bowl-shaped portion 200 and the upper and lower members 142 and 144 cooperate to define a seed treating cavity 207 in this embodiment. The flange 202 is attached to an upper portion of the exterior surface of the bowl 200, e.g., by welding. A plurality of angled members 208 may be attached to sloping portions of an interior surface of the bowl-shaped portion 200. The members 208 are preferably angled to eliminate places where seeds would be retained. A generally centrally disposed member 210 coaxially extends from the interior surface of the bowl-shaped portion 200. Lower and upper portions of the member 210 are respectively cylindrical and conical in this embodiment. The base 204 is attached to a bottom portion of the bowl 200 (FIG. 4). The cylinder 206 extends from the base 204. The bowl-shaped portion 200 is radially dimensioned to be received with the lower member 142 such that a gap of between about 10/1000 inch and 20/1000 inch is present therebetween in some embodiments. This gap may be desirable to allow an airflow between the portion 200 and the lower member 142. The cylinder 206 extends generally centrally from the base 204 and is preferably coaxial to the bowl-portion 200 in this embodiment. A shaft 212 is received in the cylinder 206 and extends through an opening in the upper support 126. In some embodiments the shaft 212 extends through both the cylinder 206 and a basal portion of the bowl 200 and is secured thereto by being attached to the axial member 210. The shaft 212 is rotatably secured in bearings 214 and 216. The bearings 214 and 216 are attached to the horizontal members 136 and 138, so that the shaft 212 can be horizontally adjusted when the bowl-portion 200 is being placed inside the lower member 142. The bearings 214, 216 are comprised of bearing blocks 217 and roller bearings 219.

Figure 10:
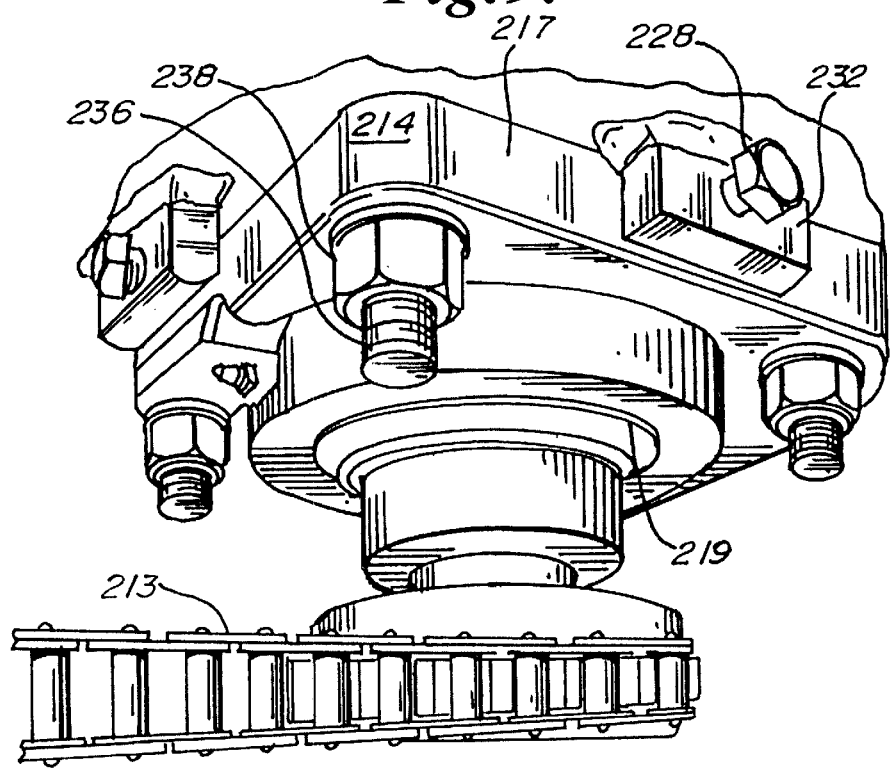
FIG. 10 is a perspective view of the present adjustment assembly.
Figure 12:
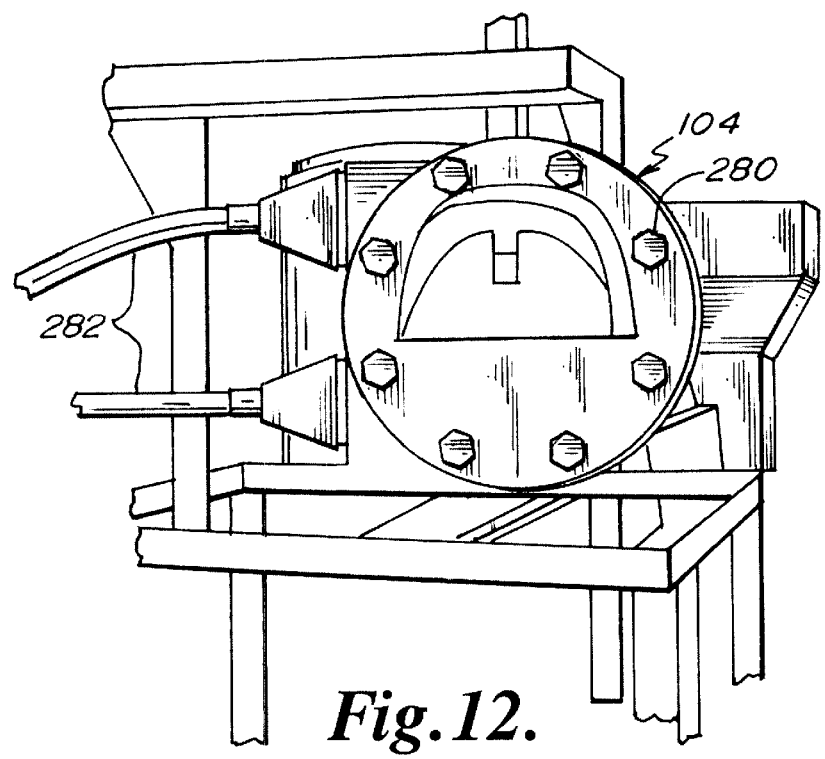
FIG. 12 is a perspective view of a portion of the present liquid treatment metering system.
Figure 14:
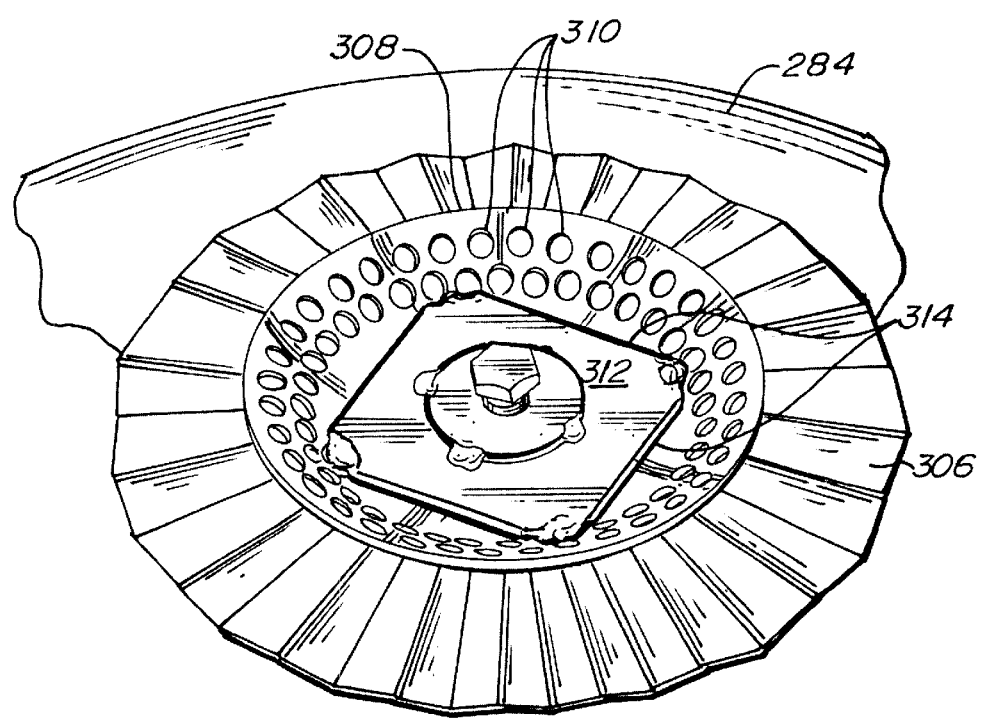
FIG. 14 is a perspective view of the atomizer elements present on the atomizer of FIG. 13.
Figure 13:
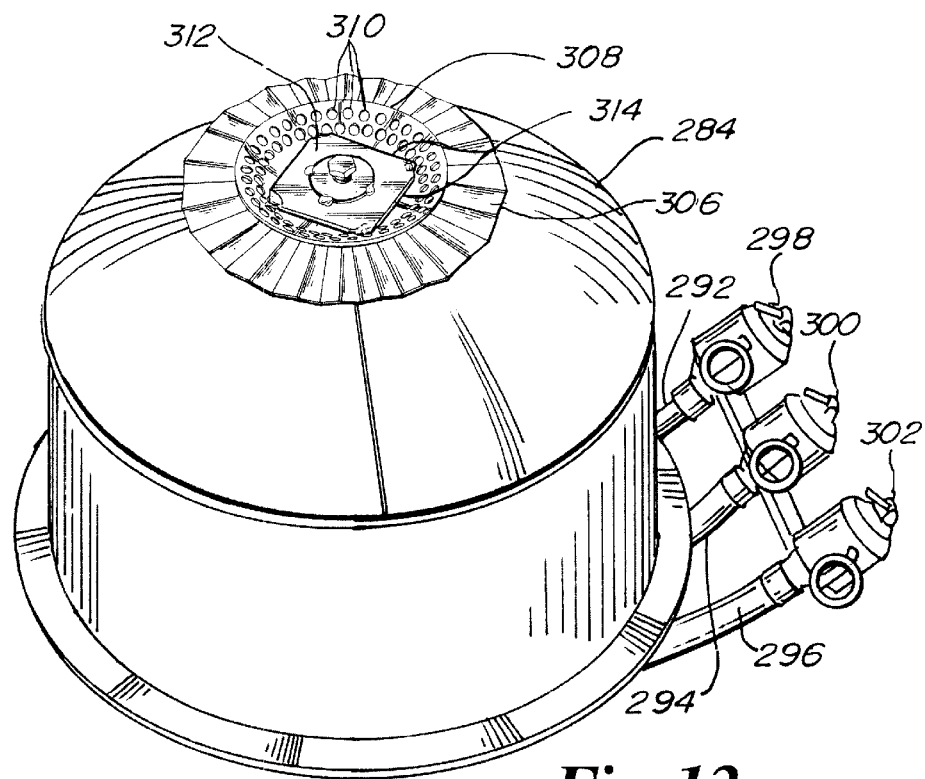
FIG. 13 is a perspective view of an atomizer unit of the present liquid treatment metering system.

In contrast to similar seed treating devices, the bowl-portion 200 may be positioned and adjusted within the lower member 142 during assembly and during repairs by means of upper and lower horizontal adjustment assemblies 224 and 226. The upper and lower horizontal adjustment assemblies 224 and 226 each include a plurality of (e.g., four) respective adjustment or set screws 228 and 230. The adjustment screws 228 and 230 are preferably received in respective threaded blocks 232 and 240 (FIGS. 4 and 10). The bearings 214 and 216 are attached to the lower surfaces of the horizontal members 136 and 138 by bolts 236 and nuts 238. The bolts 236 are accommodated in oversized or slotted openings in the horizontal members 136 and 138 or within the bearings 214 and 216. The position of the bowl-shaped portion 200 within the lower member 142 can be adjusted by threading the adjustment screws 228 and 230, thereby horizontally displacing the bearings 214 and 216 and the attached bowl-shaped portion 200. The nuts 238 are then tightened to secure the bolts 236 within the treating member 146 in a desired position. In some embodiments, the adjustment screws 228 and 230 and blocks 232 and 234 may not be necessary. In these cases, the position of the bowl-shaped portion 200 may be adjusted by moving the bearings 214 and 216 so that the bolts 236 are moved within the oversized holes or slots. The present adjustment assembly substantially reduces the time and effort necessary to correctly position the treating member 146 within the lower member 142 during assembly and after repairs.

The present bowl-shaped portion is operably rotated by a motor 240 in mechanical communication with the shaft 212 by a belt 213 as illustrated in FIG. 4. Of course, a series of gears, axels, roller chains 213 (FIG. 10), and the like may mechanically connect the motor 240 and the shaft 212. Obviously, the speed of rotation can be determined, e.g., by the speed of the motor as well as gear and shaft diameters. A fan 241 provides an air flow into the lower member 142 which is forced between the lower member 142 and the bowl-shaped member 200.

Figure 11:
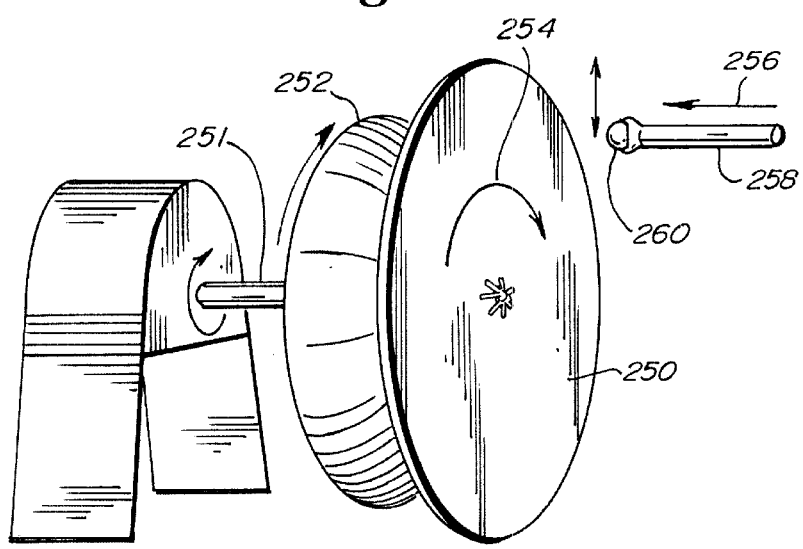
FIG. 11 is a perspective view of the lower member of the present coating unit being unitarilly formed by a process of this invention.
Figure 6:
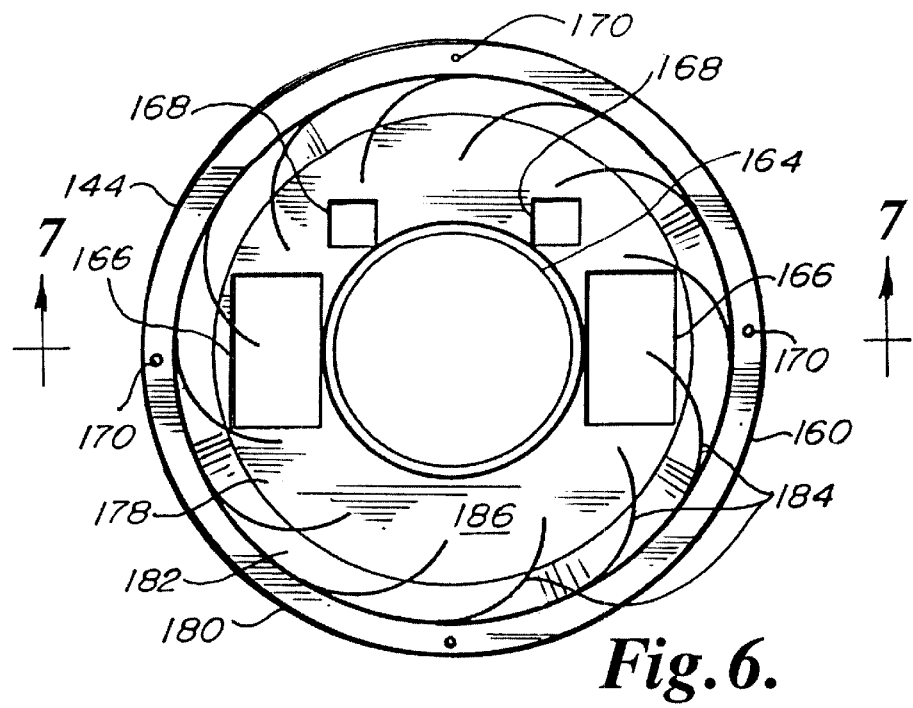
FIG. 6 is a plan view of the inner surface of the upper member of the present coating unit.
Figure 7:
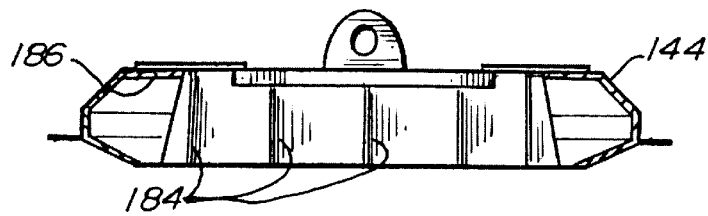
FIG. 7 is a side view of the upper member of FIG. 6.
Figure 8:
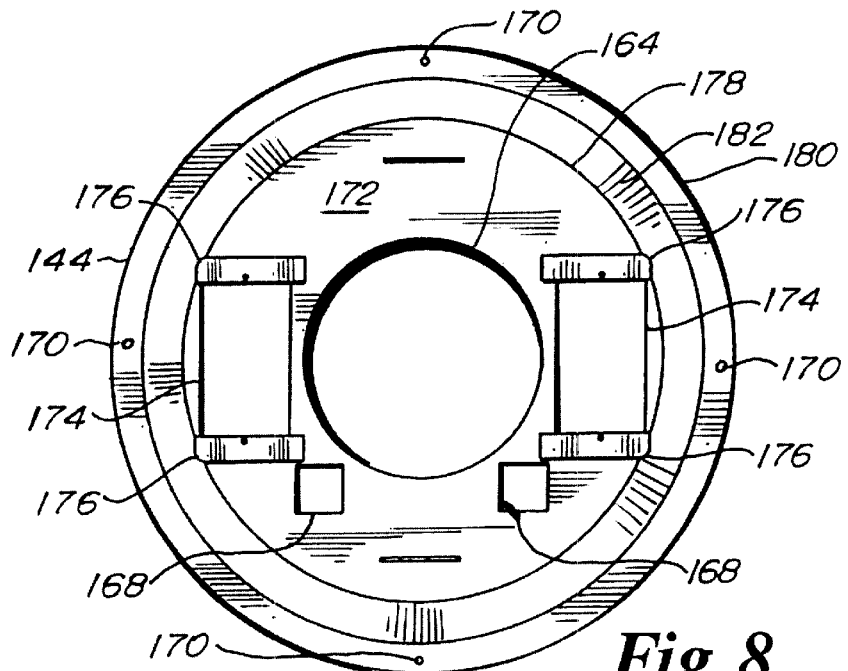
FIG. 8 is a plan view of the outer surface of the upper member of FIG. 6.
Figure 9:
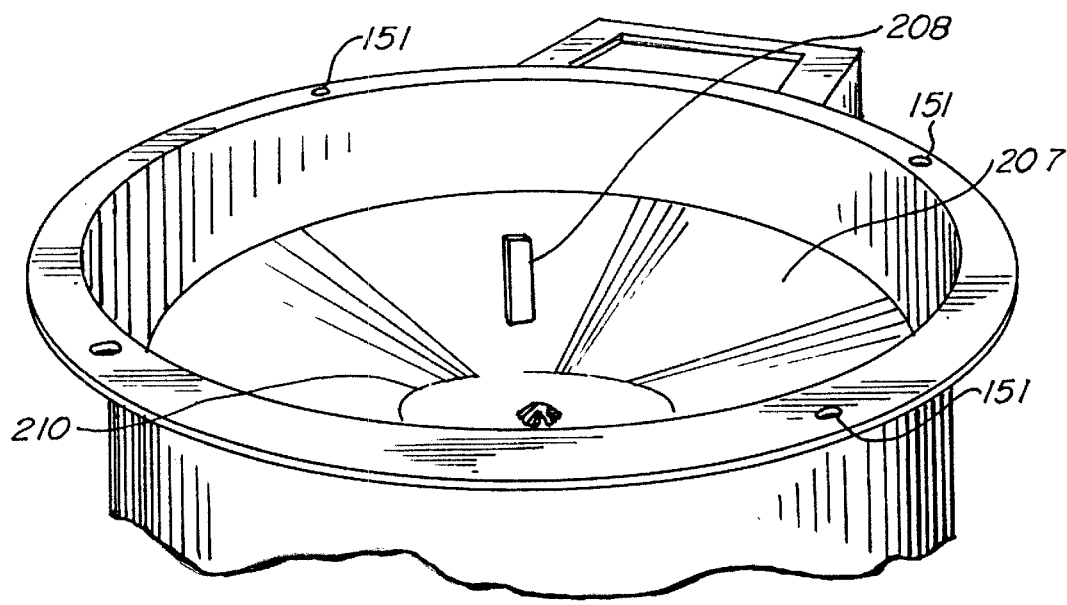
FIG. 9 is a perspective view of the inner surface is the lower and treating members of the present coating unit.

The present bowl-shaped portion 200 may be fashioned from a single metallic sheet 250 (FIG. 11). While forming the present bowl-shaped portion is explained and illustrated, the present upper (lid) member may be formed by a substantially similar spin forming method as well. In one embodiment, a 1½ inch opening is formed in a central portion of the metallic sheet 250. A shaft 251 and mandrel 252 to the sheet at the opening and the shaft, mandrel, and metallic sheet 250 are rotated in the direction of the arrow 254. Pressure is exerted on the sheet 250 in the direction of the arrow 256 by a member 258. The member 258 may have a spherically- or cylindrically-shaped element or roller 260 at its tip. When the member 258 applies pressure to the sheet 250, the mandrel is a negative template 262 positioned on the opposite surface of the sheet 250 from the member 258. The unitary bowl-shaped portion 200 is thereby formed by the pressure exerted from the member 258. In contrast to similar structures of the prior art, any desired number of bowl-shaped portions 200 can be made more efficiently and more uniformly by this method within a shorter time period as compared to conventional methods. Also in contrast to similar structures of the prior art, the present bowl-shaped portions are substantially smooth, thereby requiring little or no buffing or sanding after being formed.

Referring to FIGS. 12, 13, 14, and 15, the liquid treatment metering system 104 provides a desired dosage of liquid seed treating formulations to seed being treated within the coating unit 102. In one embodiment, the liquid treatment metering system 104 includes one or more peristaltic pumps 280, one or more hoses 282, and an atomizing unit 284. A first end 286 of the hose 282 is in fluid communication with a source of liquid seed treating formulation (not shown). A second end 288 of the hose 282 is connected to the atomizing unit 284. The hose 282 is routed through the peristaltic pump 280. When actuated, the peristaltic pump 280 pumps the liquid seed treating formulation from the source to the atomizing unit 284. The atomizing unit 284 is operably secured within the opening 164 of the upper member 144. As can be seen from FIG. 13, several supply hoses, e.g. hoses 292, 294, and 296 may be connected to the present atomizing unit. Respective connectors 298, 300, and 302 may be attached to the ends of the hoses 292, 294, and 296. The connectors 298, 300, and 302 mate with the liquid treatment supply hose 282 in this embodiment. The present atomizer may include an electric motor 304 and an interior tubing network (not shown). The tubing network fluidly communicates the hoses 292, 294, and 296 to respective first and second atomizer elements 306 and 308. The first atomizer element 306 is generally circular and may be fluted, the fluted portions extending radially from the center. The second atomizer element 308 generally frustoconically extends from the first atomizer element 306 and defines a plurality of orifices 310 therein. A plate 312 partially covers an opening 314. The liquid seed treatment formulation is delivered to the atomizer elements 306 and 308 via the opening 314. When the atomizer is operating the electric motor is rapidly rotating the atomizer elements 306 and 308 (e.g., 3000 rpm). The liquid seed formulation is pumped out of the opening 314 and is atomizing by being passed through the orifices 310 and by contact with, and air currents generated by, the flutes present on the first atomizer 306. In contrast to droplets or mists generated by some other liquid treatment delivery mechanisms, the atomized formulation more completely and uniformly coats seeds being treated in the present system. The rates of liquid seed treatment formulation are determined by the peristaltic pump setting in this embodiment.

Figure 16:
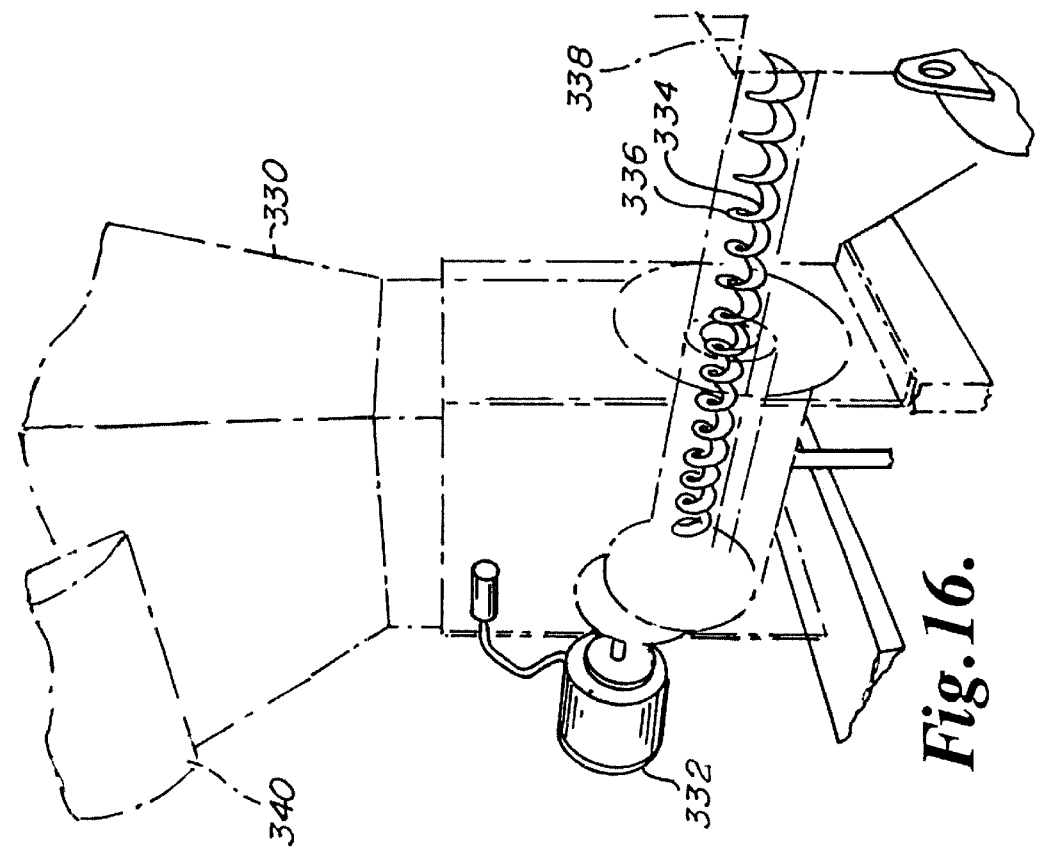
FIG. 16 is a perspective view of the present dry treatment metering system.
Figure 15:
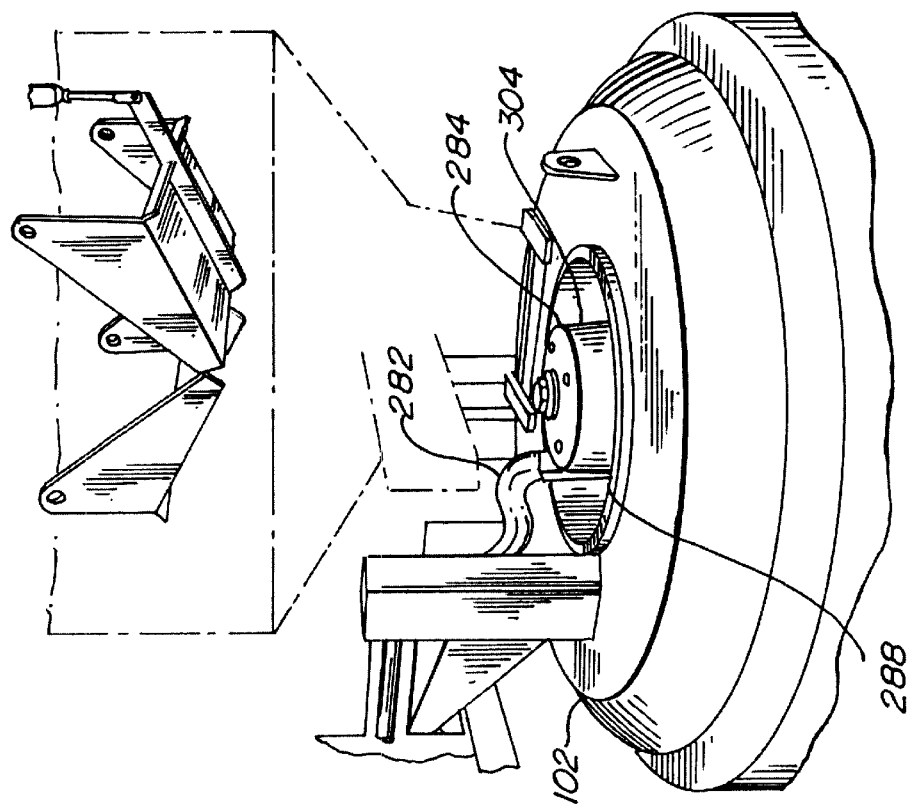
FIG. 15 is a perspective view showing the atomizer electric motor, portions of the coating unit upper member; and liquid treatment delivery hose.

The dry treatment metering system 106 provides dry seed treating formulations (e.g., powdered) to seed being treated in the coating unit 102 (FIG. 16). One or more dry treatment metering system 106 may be present. The dry treatment metering system 106 includes a hopper 330, a motor 332, an auger 334, an auger tube 336, and a delivery tube 338. The hopper holds an amount of dry seed treatment formulation. The auger 334 extends through a lower portion of the hopper 330 and the auger tube 336 and is rotated by the motor 332. The delivery tube 338 is connected to the auger tube 336 and is accommodated by one of the openings 168 in the upper member 144. An optional vibrator 340 may be attached to the hopper 330 to ensure that dry seed treating formulations continually settle down the hopper as they are being metered into the coating unit 102. Operably, dry seed treating formulations are metered from the hopper 330, through the auger tube 336, and into the delivery tube 338 by the auger 334. The dry seed treating formulations then drop through the delivery tube 338 into the coating unit 102.

Referring to FIGS. 1, 17, 18, and 19, the seed metering system 108 delivers seed to the coating unit 102 and includes a holding bin 350 and a weigh hopper 352. The seed is conveyed from the holding bin 350 via a clamshell gate 354. The clamshell gate 354 is opened and closed by an actuator (e.g., solenoid, pneumatic) 356. Seed from the weigh hopper 352 is conveyed into the coating unit 102 when gates 360 are opened by actuators 362. A mechanism, such as a weigh bar or load cell 364 senses the weight of seed present in the weigh hopper 352. In response to a predetermined amount of seed in the weigh hopper 352 sensed by the load cell 364, the clamshell gate 354 is closed by the actuators 356 to prevent more seed from being dropped into the hopper 352. When a batch of seed is to be treated, the actuators 362 open the gates 360 and the seed held in the weigh hopper 352 is dumped into the coating unit 102 through the vent 358. Optionally, a sensing from the load cell's 364 causes the actuators 356 to open the clamshell gates 354 and allow more seed to drop into the weigh hopper 352. When the seed present within the weigh hopper 352 reaches a predetermined weight, a sensing from the load cells 364 causes the actuators 356 to close the clamshell gates 354.

Seed being processed in the present seed treating system may be controlled by the optional PLC controller 110. In one embodiment, the PLC controller 110 stores retention times and sequences for multiple liquid and dry metering for various seed treating protocols. These protocols may be either pre-programmed or retained after trial and error. The present PLC controller may receive sensings from the load cells 364, monitor seed retention times within the coating unit 102, began and cease dispensing liquid and dry seed treatment formulations, and open and close the door 154 of lower member 142. The present PLC controller may also received sensings of amounts of seed treating formulations present in the reservoirs holding the liquid seed treating formulations and in the hoppers holding the dry seed treating formulations. When either the reservoirs or hoppers are empty, the PLC controller may actuate an alarm and/or cease operation of the unit in response. The present PLC controller may also control the sequence and/or the amounts of seed treatment formulation applied. For example, the dry and liquid formulations can be applied concurrently or sequentially. Moreover, the dry formulation may be applied before, or after, the liquid formulation application. It is further contemplated that the present PLC controller can be programmed to treat a predetermined number of seed batches or to continue to treat seed batches until there is no more seed available in the holding bin.

Figure 17:
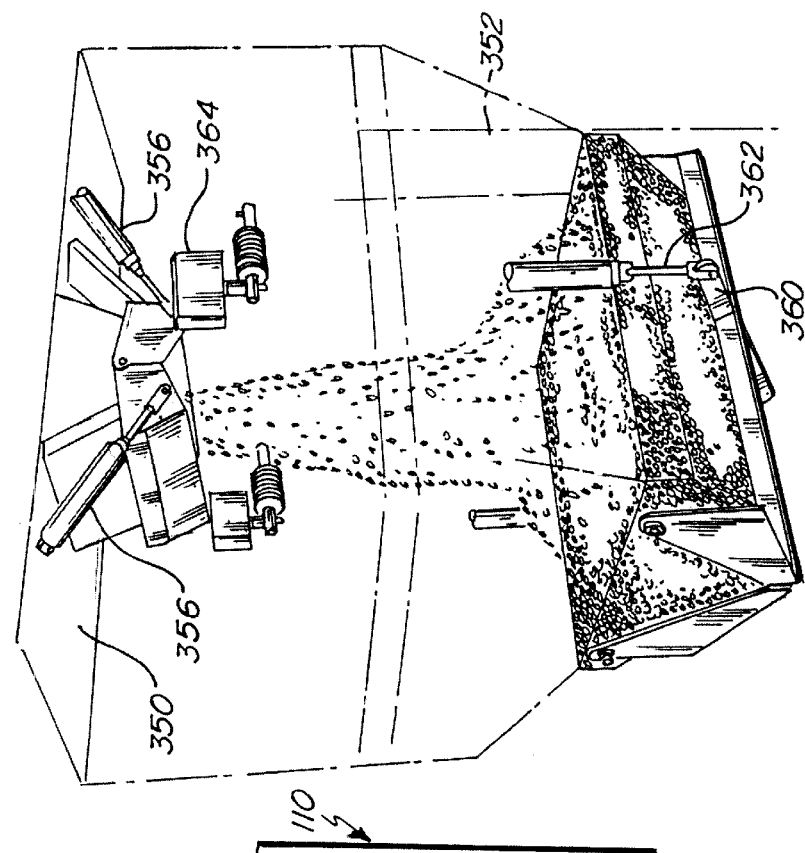
FIG. 17 is a first perspective view of a portion of the present seed metering system.
Figure 18:
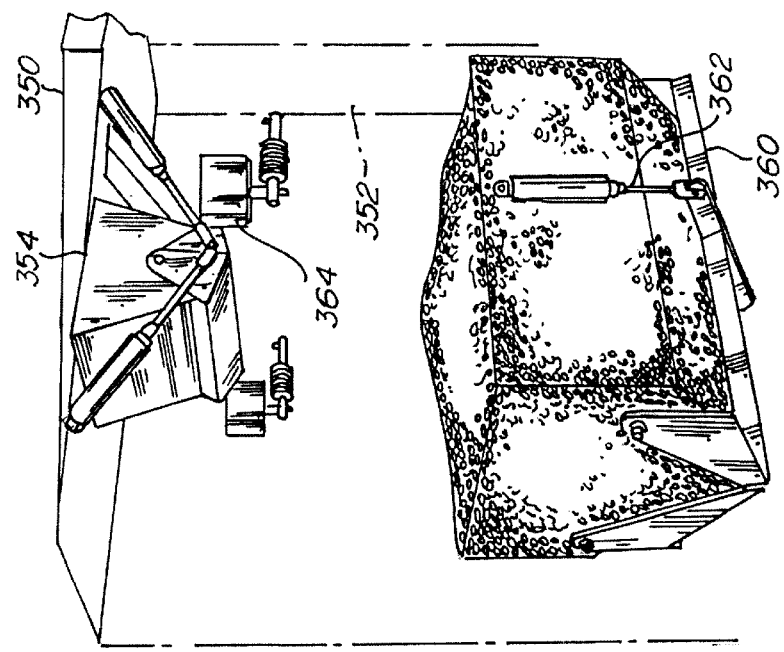
FIG. 18 is a second perspective view of the portion of the seed metering system of FIG. 17.
Figure 21:
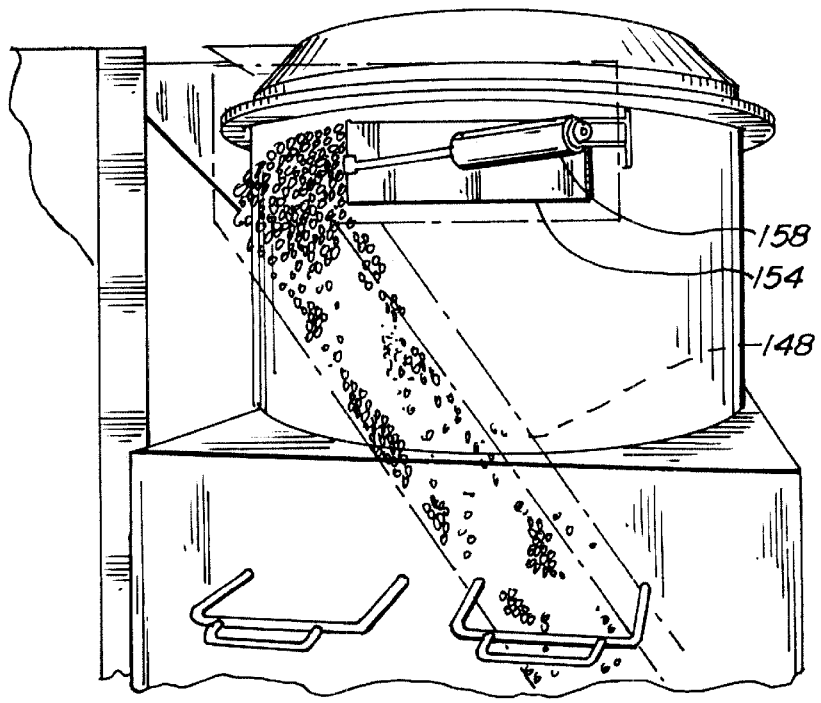
FIG. 21 is a perspective view showing treated seed being discharged from the present coating unit.
Figure 20:
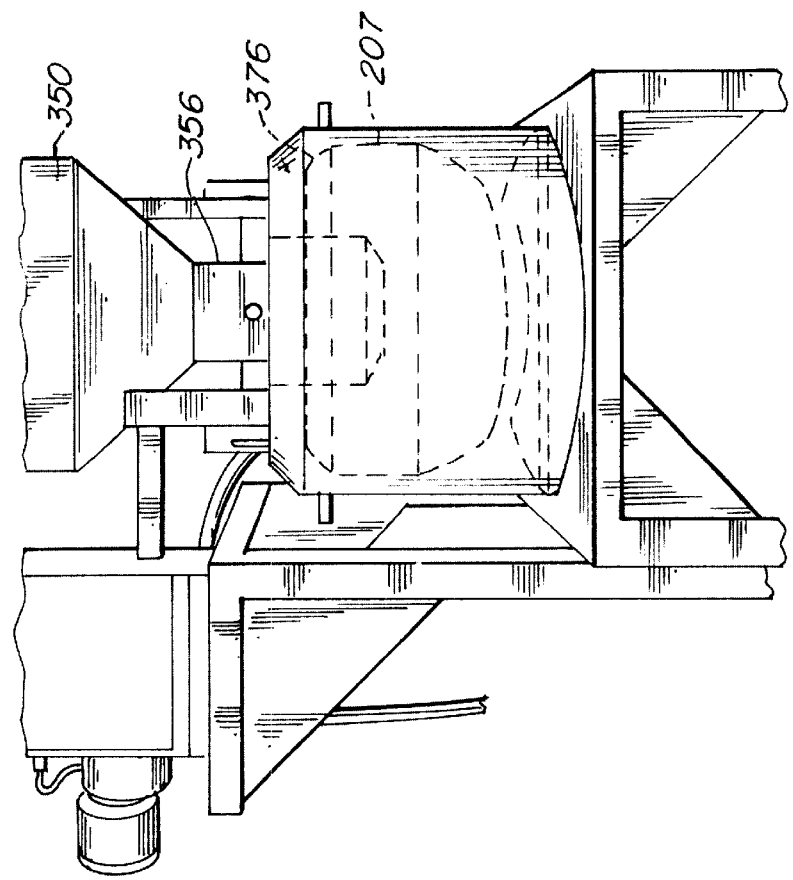
FIG. 20 is a perspective view of seed being rotatably treated within the present coating unit.
Figure 19:
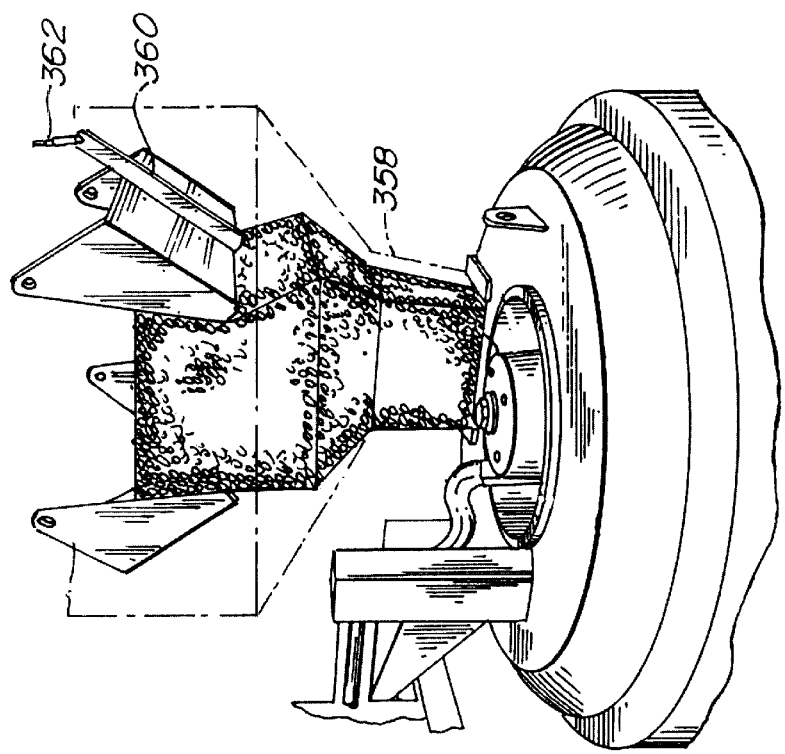
FIG. 19 is a third perspective view of the present seed metering system, showing seed being conveyed into the present coating unit.

In operation, seed is allowed to fall from the holding bin 350 into the weigh hopper 352 (FIGS. 17–19). When the load cell 364 senses a predetermined amount of seed present in the weigh hopper 352, the actuators 356 closes the clamshell gate 354. When the coating unit 102 is empty and ready for another batch, the actuators 362 open the gates 360 and the seed flows through the vent 358 and into the coating unit 102. Within the coating unit 102, the bowl 200 is rotating (e.g., between about 100 rpm and 200 rpm). The seed is also rotated horizontally by the action of the vanes 184. A flow of air is passing between the bowl 200 and the lower member 142. The airflow presents seeds and particulates from entering the gap between the bowl portion 200 and the lower member 142. The centrifugal force imparted by the rotating bowl 200 and the lifting force from the angled members 208 cause the seed to rotate between the bottom and the top of the bowl 200 as depicted by arrow's 376 (FIG. 20). The rotating seed is exposed to the atomized liquid, and/or dry, seed treatment formulations. Because the seed is rotating very rapidly, it is continually coated by the formulations present. The PLC controller causes the liquid and dry treatment metering systems 104 and 106 to deliver predetermined amounts of formulations into the coating unit 102 either sequentially or together. After a predetermined retention time, the treated seed has been uniformly coated with the formulations. The PLC then causes the opener/closer 158 to open the door 154 and allow the seed to exit the coating unit 102 via the treating unit 148 (FIG. 21). The receiving unit 148 may either direct the seed to be bagged or collected in a tank or bin. After a preset time interval, the opener/closer 158 closes the door 154 and the coating unit 102 is ready for another batch of seed.

By way of illustration, and not limitation, one embodiment of the present coating unit can accommodate a volume of about 1.7 bushels. Thus, a single seed batch may weigh about 100 pounds (assuming a test weight of 60 pounds per bushel). In many cases, retention times may be as short as 20 seconds. Thus, during applications with short retention times, 200 pounds of seed per minute can be processed (12,000 pounds per hour).

Because numerous modifications of this invention may be made without departing from the spirit thereof, the scope of the invention is not to be limited to the embodiments illustrated and described. Rather, the scope of the invention is to be determined by the appended claims and their equivalents.

What is claimed is:

1. A batch seed coating unit, comprising:
    a lower member;
    a rotatable bowl portion disposed in the lower member;
    a drive motor for rotating the bowl portion;
    an upper bowl member cooperating with the lower member to enclose the bowl portion and define a seed treatment cavity;
    an adjustment assembly in mechanical communication with the bowl portion for horizontally adjusting the positioning of the bowl portion within the lower member and comprising an adjustment screw in mechanical communication with the bowl portion, said bowl portion horizontally displaced and thereby adjusted by rotating said adjustment screw; and
    a seed treatment metering system for injecting seed treatment material into the seed treatment cavity.

2. The seed coating unit of claim 1, in which the lower member is generally cylindrical.

3. The seed coating unit of claim 1, further comprising a shaft depending from the bowl portion and connected to the adjustment assembly.

4. The seed coating unit of claim 1, in which the bowl portion is substantially unitary and spin formed.

5. The seed coating unit of claim 3, wherein the adjustment assembly comprises a plurality of set screws and a bearing block with the shaft engaged in the bearing block and the set screws adjustably engaged with the bearing block.

6. The seed coating unit of claim 1, the lower member defining an egress opening and further comprising a door dimensioned to cover the egress opening.

7. The seed coating unit of claim 1, the upper member further comprising a plurality of vanes for channeling seed being treated therein.

8. The seed coating unit of claim 1, further comprising a controller in electrical communication with the seed coating unit.

9. The seed coating unit of claim 8, in which the controller is programmable.

10. The seed coating unit of claim 1, in which the bowl portion is substantially unitary.

11. The seed coating unit of claim 7, in which the vanes extend from an inner surface of the upper member.

12. The seed coating unit of claim 11, in which the vanes are generally arcuate.

13. The seed coating unit of claim 1, in which the seed treatment metering system is configured to convey a dry seed treating formulation into the seed treatment cavity.

14. The seed coating unit of claim 1, in which the seed treatment metering system is configured to convey a liquid seed treating formulation into the seed treatment cavity.

15. A batch seed coating unit, comprising:

a lower member;

a rotatable bowl portion disposed in the lower member;

a drive motor for rotating the bowl portion;

an upper bowl member cooperating with the lower member to enclose the bowl portion and define a seed treatment cavity, the upper member comprising a plurality of vanes extending from an inner surface of the upper member;

an adjustment assembly in mechanical communication with the bowl portion for horizontally adjusting the positioning of the bowl portion within the lower member; and a seed treatment metering system for injecting seed treatment material into the seed treatment cavity.

16. The seed coating unit of claim 15, in which each of said plurality of vanes is generally arcuate.

17. The seed coating unit of claim 15, in which the lower member is generally cylindrical.

18. The seed coating unit of claim 15, further comprising a shaft depending from the bowl portion and connected to the adjustment assembly.

19. The seed coating unit of claim 18, wherein the adjustment assembly comprises a plurality of set screws and a bearing block with the shaft engaged in the bearing block and the set screws adjustably engaged with the bearing block.

20. The seed coating unit of claim 15, in which the bowl portion is substantially unitary and spin formed.

21. The seed coating unit of claim 15, the lower member defining an egress opening and further comprising a door dimensioned to cover the egress opening.

22. The seed coating unit of claim 15, further comprising a controller in electrical communication with the seed coating unit.

23. The seed coating unit of claim 22, in which the controller is programmable.

24. The seed coating unit of claim 15, in which the bowl portion is substantially unitary.

25. The seed coating unit of claim 15, in which the seed treatment metering system is configured to convey a dry seed treating formulation into the seed treatment cavity.

26. The seed coating unit of claim 15, in which the seed treatment metering system is configured to convey a liquid seed treating formulation into the seed treatment cavity.

* * * * *